(12) United States Patent
Matsunaga et al.

(10) Patent No.: US 8,179,069 B2
(45) Date of Patent: May 15, 2012

(54) ELECTRIC POWER TOOL, CONTROL UNIT AND RECORDING MEDIUM

(75) Inventors: Yutaka Matsunaga, Anjo (JP); Hirokatsu Yamamoto, Anjo (JP); Takuya Kusakawa, Anjo (JP)

(73) Assignee: Makita Corporation, Anjo-shi (JP)

( * ) Notice: Subject to any disclaimer, the term of this patent is extended or adjusted under 35 U.S.C. 154(b) by 765 days.

(21) Appl. No.: 12/222,650

(22) Filed: Aug. 13, 2008

(65) Prior Publication Data

US 2009/0051306 A1      Feb. 26, 2009

(30) Foreign Application Priority Data

Aug. 24, 2007 (JP) ................................. 2007-218503

(51) Int. Cl.
*H02P 7/00* (2006.01)
(52) U.S. Cl. ........ 318/434; 318/430; 318/437; 318/599; 318/456
(58) Field of Classification Search .................. 318/430, 318/434, 437, 445, 446, 450, 456, 461, 599; 173/217, 221, 4, 141, 161, 213, 170
See application file for complete search history.

(56) References Cited

U.S. PATENT DOCUMENTS

| | | | | |
|---|---|---|---|---|
| 3,988,656 A | * | 10/1976 | Schnizler et al. | 388/830 |
| 5,440,215 A | * | 8/1995 | Gilmore | 318/432 |
| 5,731,673 A | | 3/1998 | Gilmore | |
| 5,814,957 A | * | 9/1998 | Yoshida | 318/400.11 |
| 7,222,050 B2 | * | 5/2007 | Kakegawa et al. | 702/183 |
| 7,334,648 B2 | * | 2/2008 | Arimura | 173/179 |
| 7,712,318 B2 | * | 5/2010 | Iwasaki | 62/3.7 |
| 7,821,217 B2 | * | 10/2010 | Abolhassani et al. | 318/432 |
| 7,861,796 B2 | * | 1/2011 | DeCicco et al. | 173/1 |
| 2001/0050540 A1 | * | 12/2001 | Takayama et al. | 318/599 |
| 2002/0057069 A1 | * | 5/2002 | Kushida | 318/727 |

FOREIGN PATENT DOCUMENTS

| | | |
|---|---|---|
| EP | 1 209 805 A1 | 5/2002 |
| JP | B2-4-35970 | 6/1992 |
| JP | A-2007-7784 | 1/2007 |

OTHER PUBLICATIONS

European Search Report issued in European Patent Application No. 08014076.7 by the European Patent Office on Nov. 16, 2009.

* cited by examiner

*Primary Examiner* — Walter Benson
*Assistant Examiner* — Thai Dinh
(74) *Attorney, Agent, or Firm* — Oliff & Berridge, PLC

(57) ABSTRACT

An electric power tool includes a direct current motor, at least one switching device, a trigger switch, a control unit, and a drive unit. The control unit sets a driving duty ratio for PWM controlling the direct current motor so as to increase the driving duty ratio in a stepwise manner in accordance with an operation continuation time of the trigger switch during a period from when an operation of the trigger switch is started until when a predetermined start-up time has elapsed.

11 Claims, 5 Drawing Sheets

ELECTRIC POWER TOOL, CONTROL UNIT AND RECORDING MEDIUM

CROSS-REFERENCE TO RELATED APPLICATIONS

This application claims the benefit of Japanese Patent Application No. 2007-218503 filed Aug. 24, 2007 in the Japan Patent Office, the disclosure of which is incorporated herein by reference.

BACKGROUND

The present invention relates to an electric power tool that includes a direct current motor as a power source and controls a rotation of the direct current motor depending on an operation amount of a trigger switch.

A conventional electric power tool of this type includes a bridge circuit (in other words, an inverter circuit) which is constituted by switching devices (high-side switches and low-side switches), each provided between each of terminals of the direct current motor and a positive electrode and a negative electrode of a direct current power source (a battery), as a drive circuit for the direct current motor.

When a user operates a trigger switch, a control circuit calculates, on an operation amount, a driving duty ratio for PWM controlling the direct current motor and turns on/off the switching devices in the bridge circuit in accordance with the driving duty ratio, thereby controlling a rotation of the direct current motor.

In the electric power tool, when the direct current motor as a power source is mechanically locked during driving, a large electric current may flow through the direct current motor or the drive circuit therefor, thereby causing these components to be heated and burnt out in some cases.

Accordingly, the electric power tool usually includes a protection circuit. The protection circuit determines whether or not a current flowing through the direct current motor (i.e., a motor current) has reached a predetermined current value for lock determination during driving of the direct current motor, thereby determining whether or not the direct current motor is locked. When it is determined that the direct current motor is locked, the protection circuit stops the driving of the direct current motor.

SUMMARY

Although lock determination by the above protection circuit is performed by detecting the motor current, a current detection circuit for detecting the motor current is not always provided in the electric power tool in order to simplify a circuit configuration. In such an electric power tool incapable of detecting the motor current, lock determination may be performed based on a voltage fluctuation of the direct current power source (the battery) that supplies power to the direct current motor.

Specifically, since a power source voltage (a battery voltage) supplied from the direct current power source to the direct current motor is temporarily reduced when the direct current motor is locked and an excess lock current flows through the direct current motor, lock determination of the direct current motor may be performed also by monitoring the battery voltage.

In the event that an operation amount of the trigger switch of the electric power tool is a maximum operation amount when the trigger switch is operated to start driving of the direct current motor, a driving duty ratio also becomes maximum. In this case, a starting current flowing through the direct current motor also becomes larger, and thereby the power source voltage may be reduced by the starting current during a time period from when driving of the direct current motor is started until when the direct current motor starts rotating normally.

Accordingly, in the electric power tool in which lock determination of the direct current motor is performed based on the power source voltage, lock determination cannot be performed normally immediately after driving of the direct current motor is started, and should be started after a predetermined time since driving of the direct current motor is started. In this case, however, when the direct current motor is in a locked state before driving of the direct current motor is started, an excess lock current flows during a time period from when driving of the direct current motor is started until when lock determination is started, resulting in deterioration of the direct current motor and the drive circuit.

In one aspect of the present invention, it is preferable, in an electric power tool which controls a rotation of a direct current motor as a power source depending on an operation amount of a trigger switch, that a starting current flowing when driving of the direct current motor is started is suppressed and thus abnormality determination, such as lock determination based on a power source voltage, may be performed immediately after driving of the direct current motor is started.

An electric power tool in a first aspect of the present invention includes a direct current motor, at least one switching device, a trigger switch, a control unit, and a drive unit. The direct current motor is rotated by electric power supplied from a direct current power source and drives a tool bit. The at least one switching device is provided on a current path from the direct current power source to the direct current motor. The trigger switch is operated by a user. The control unit sets a driving duty ratio for PWM controlling the direct current motor so as to increase the driving duty ratio in a stepwise manner in accordance with an operation continuation time of the trigger switch during a period from when an operation of the trigger switch is started until when a predetermined start-up time has elapsed. The drive unit turns on/off the at least one switching device in accordance with the driving duty ratio set by the control unit to thereby rotate the direct current motor.

In the electric power tool configured as above, even when the user operates the trigger switch with a maximum operation amount in order to drive the tool at a high speed, the driving duty ratio is set so as to increase in a stepwise manner in accordance with the operation continuation time of the trigger switch during the period from when the operation of the trigger switch is started until when the predetermined start-up time has elapsed.

Accordingly, in the electric power tool, a starting current which flows immediately after driving of the direct current motor is started can be suppressed as compared with conventional electric power tools. Also, voltage reduction of the direct current power source caused by increase in the starting current can be suppressed since the starting current can be suppressed as described above.

According to the electric power tool in the first aspect of the present invention, therefore, determination of abnormality, such as motor lock, based on a power source voltage may be performed accurately from immediately after driving of the direct current motor is started. In this case, it may be possible to suppress deterioration of the direct current motor or at least one switching circuit due to an excess lock current flowing through these components immediately after driving of the direct current motor is started.

The control unit may be configured to set the driving duty ratio in accordance with an operation amount of the trigger switch when the start-up time has elapsed since the operation of the trigger switch is started. In this case, the driving duty ratio may be set to a maximum value corresponding to the maximum operation amount of the trigger switch after the start-up time elapses.

The control unit also may be configured to set a driving duty ratio for activating which is required to transfer the direct current motor from a stopped state to a rotating state during a period from when the operation of the trigger switch is started until when an activating time shorter than the start-up time has elapsed. In this case, the direct current motor may be transferred from the stopped state to the rotating state after the operation of the trigger switch is started.

The control unit further may be configured to determine whether or not the operation amount of the trigger switch is equal to or more than a lower limit operation amount predetermined in accordance with the driving duty ratio for activating when the activating time has elapsed since the operation of the trigger switch is started, and perform an intermittent control to intermittently supply current to the direct current motor through the drive unit when the operation amount of the trigger switch is smaller than the lower limit operation amount.

When the direct current motor continues to be driven at the driving duty ratio for activating, a rotation speed of the direct current motor converges to a certain speed. If the operation amount of the trigger switch is small and thus it is required to drive the direct current motor at a lower speed than the certain speed, the driving duty ratio should be set to a value smaller than the driving duty ratio for activating.

However, when the driving duty ratio is set to a value smaller than the driving duty ratio for activating immediately after the driving of the motor is started, it is impossible to cause the direct current motor to generate a rotation torque which exceeds a holding torque. Thus, it is impossible to transfer the direct current motor from the stopped state to the rotating state.

In the electric power tool configured as above, the driving duty ratio for activating is set as the driving duty ratio to thereby transfer the direct current motor from the stopped state to the rotating state during the period from when the operation of the trigger switch is started until when the activating time has elapsed. Subsequently, when the operation amount of the trigger switch is smaller than the lower limit operation amount, current supply to the direct current motor is performed intermittently, so that the direct current motor may be rotated at a lower speed than a rotation speed obtainable with the driving duty ratio for activating.

Accordingly, the electric power tool may expand a rotation speed range of the direct current motor controllable in accordance with the operation amount of the trigger.

The control unit may be configured to determine whether or not a first driving duty ratio set in accordance with an operation continuation time of the trigger switch is larger than a second driving duty ratio set in accordance with an operation amount of the trigger switch during the period from when the operation of the trigger switch is started until when the start-up time has elapsed, and outputs the second driving duty ratio when the first driving duty ratio is larger than the second driving duty ratio.

In the electric power tool configured as above, it can be suppressed that a larger driving duty ratio than the driving duty ratio corresponding to the operation amount of the trigger switch is outputted from the control unit to the drive unit during the period from when the operation of the trigger switch is started until when the start-up time has elapsed, and thereby the rotation speed of the direct current motor exceeds a rotation speed corresponding to the operation amount of the trigger switch.

The electric power tool in the first aspect of the present invention may include a current detection circuit for detecting a current (a motor current) flowing through the direct current motor and perform determination of abnormality, such as motor lock, based on detection results from the current detection circuit. Also, the control unit may be configured to determine whether or not a power source voltage of the direct current power source is lower than a predetermined lower limit voltage when the trigger switch is being operated and detect an abnormality of the direct current motor when the power source voltage is lower than the lower limit voltage.

That is, since the electric power tool in the first aspect of the present invention may suppress the starting current which flows immediately after driving of the direct current motor is started, and thereby suppress voltage reduction of the power source voltage caused by the starting current, the control unit configured above may accurately perform abnormality determination regarding the direct current motor from immediately after driving of the direct current motor is started.

The at least one switching device may be a plurality of switching devices. The plurality of switching devices may form a bridge circuit on the current path. The drive circuit may be configured to turn on/off the plurality of switching devices.

The electric power tool may be configured to include: a direct current motor that is rotated by electric power supplied from a direct current power source and drives a tool bit; at least one switching device that is provided on a current path from the direct current power source to the direct current motor; a trigger switch operated by a user; a control unit that sets a driving duty ratio for PWM controlling the direct current motor to be smaller than a voltage reduction duty ratio which is a driving duty ratio to reduce a power source voltage of the direct current power source below a predetermined lower limit voltage during a period from when an operation of the trigger switch is started until when a predetermined start-up time has elapsed; and a drive unit that turns on/off the at least one switching device in accordance with the driving duty ratio set by the control unit to thereby rotate the direct current motor.

In the electric power tool configured as above, even if the user operates the trigger switch with a maximum operation amount in order to drive the tool at a high speed, the driving duty ratio is set to be smaller than the voltage reduction duty ratio during the period from when the operation of the trigger switch is started until when the predetermined start-up time has elapsed.

According to the electric power tool, therefore, the starting current which flows immediately after driving of the direct current motor is started can be suppressed as compared with conventional tools. Also, voltage reduction of the direct current power source caused by increase in the starting current can be suppressed since the starting current can be suppressed as described above.

According to the electric power tool, therefore, determination of abnormality, such as motor lock, based on the power source voltage may be performed accurately from immediately after driving of the direct current motor is started. In this case, it may be possible, for example, to suppress deterioration of the direct current motor or the at least one switching circuit due to an excess lock current flowing through these components immediately after driving of the direct current motor is started.

A control unit in a second aspect of the present invention includes an operation detecting section and a duty ratio setting section. The operation detecting section detects an operation of a trigger switch operated by a user. The duty ratio setting section sets a driving duty ratio for PWM controlling a direct current motor so as to increase the driving duty ratio in a stepwise manner in accordance with an operation continuation time of the trigger switch during a period from when the operation detecting section detects the operation of the trigger switch until when a predetermined start-up time has elapsed.

In an electric power tool provided with the control unit configured as above, even when the user operates the trigger switch with a maximum operation amount in order to drive the tool at a high speed, the driving duty ratio may be set so as to increase in a stepwise manner in accordance with the operation continuation time of the trigger switch during the period from when the operation of the trigger switch is started until when the predetermined start-up time has elapsed.

According to the electric power tool, therefore, the starting current which flows immediately after driving of the direct current motor is started can be suppressed as compared with conventional tools. Also, voltage reduction of the direct current power source caused by increase in the starting current can be suppressed since the starting current can be suppressed as described above.

Thus, according to the electric power tool provided with the control unit in the second aspect of the present invention, determination of abnormality, such as motor lock, based on the power source voltage may be performed accurately from immediately after driving of the direct current motor is started. In this case, it may be possible, for example, to suppress deterioration of the direct current motor or the at least one switching device due to an excess lock current flowing through these components immediately after driving of the direct current motor is started.

The control unit may be configured to include: an operation detecting section that detects an operation of a trigger switch operated by a user; and a duty ratio setting section that sets a driving duty ratio for PWM controlling a direct current motor to be smaller than a voltage reduction duty ratio which is a driving duty ratio to reduce a power source voltage of a direct current power source for supplying power to the direct current motor below a predetermined lower limit voltage during a period from when the operation detecting section detects an operation of the trigger switch until when a predetermined start-up time has elapsed.

In an electric power tool provided with the control unit configured as above, even when the user operates the trigger switch with a maximum operation amount in order to drive the tool at a high speed, the driving duty ratio may be set to be smaller than the voltage reduction duty ratio during the period from when the operation of the trigger switch is started until when the predetermined start-up time has elapsed.

According to the electric power tool, therefore, the starting current which flows immediately after driving of the direct current motor is started can be suppressed as compared with conventional tools. Also, voltage reduction of the direct current power source caused by increase in the starting current can be suppressed since the starting current can be suppressed as described above.

Thus, according to the electric power tool, determination of abnormality, such as motor lock, based on the power source voltage may be performed accurately from immediately after driving of the direct current motor is started. In this case, it may be possible, for example, to suppress deterioration of the direct current motor or the at least one switching device due to an excess lock current flowing through these components immediately after driving of the direct current motor is started.

A program in a third aspect of the present invention causes a computer to execute an operation detection step and a driving duty ratio setting step. In the operation detection step, the computer detects an operation of a trigger switch operated by a user. In the driving duty ratio setting step, the computer increases a driving duty ratio for PWM controlling a direct current motor in a stepwise manner in accordance with an operation continuation time of the trigger switch during a period from when an operation of the trigger switch is detected in the operation detection step until when a predetermined start-up time has elapsed.

In a case where the program is executed by a computer installed in an electric power tool, even when the user operates the trigger switch with a maximum operation amount in order to drive the tool at a high speed, the driving duty ratio is set so as to increase in a stepwise manner in accordance with the operation continuation time of the trigger switch during the period from when the operation of the trigger switch is started until when the predetermined start-up time has elapsed.

Accordingly, in the electric power tool, a starting current which flows immediately after driving of the direct current motor is started can be suppressed as compared with conventional electric power tools. Also, voltage reduction of the direct current power source caused by increase in the starting current can be suppressed since the starting current can be suppressed as described above.

Thus, according to the electric power tool including the program in the third aspect of the present invention, determination of abnormality, such as motor lock, based on the power source voltage may be performed accurately from immediately after driving of the direct current motor is started. In this case, it may be possible, for example, to suppress deterioration of the direct current motor or the at least one switching device due to an excess lock current flowing through these components immediately after driving of the direct current motor is started.

The program may be configured to cause a computer to execute: an operation detection step of detecting an operation of a trigger switch operated by a user; and a driving duty ratio setting step of setting a driving duty ratio for PWM controlling a direct current motor to be smaller than a voltage reduction duty ratio which is a driving duty ratio to reduce a power source voltage of a direct current power source for supplying power to the direct current motor below a predetermined lower limit voltage during a period from when the operation of the trigger switch is detected in the operation detection step until when a predetermined start-up time has elapsed.

In an electric power tool provided with a computer executing the program, even when the user operates the trigger switch with a maximum operation amount in order to drive the tool at a high speed, the driving duty ratio may be set to be smaller than the voltage reduction duty ratio during the period from when the operation of the trigger switch is started until when the predetermined start-up time has elapsed.

According to the electric power tool, therefore, the starting current which flows immediately after driving of the direct current motor is started can be suppressed as compared with conventional tools. Also, voltage reduction of the direct current power source caused by increase in the starting current can be suppressed since the starting current can be suppressed as described above.

Thus, according to the electric power tool, determination of abnormality, such as motor lock, based on the power source voltage may be performed accurately from immediately after driving of the direct current motor is started. In this case, it may be possible, for example, to suppress deterioration of the direct current motor or the at least one switching device due to an excess lock current flowing through these components immediately after driving of the direct current motor is started.

The programs may be recorded (stored) in a recording medium readable by a computer, and may be executed by the computer through the recording medium.

BRIEF DESCRIPTION OF THE DRAWINGS

The present invention will now be described in an embodiment by way of example with reference to the accompanying drawings, in which.

DETAILED DESCRIPTION OF THE PREFERRED EMBODIMENTS

Figure 1:
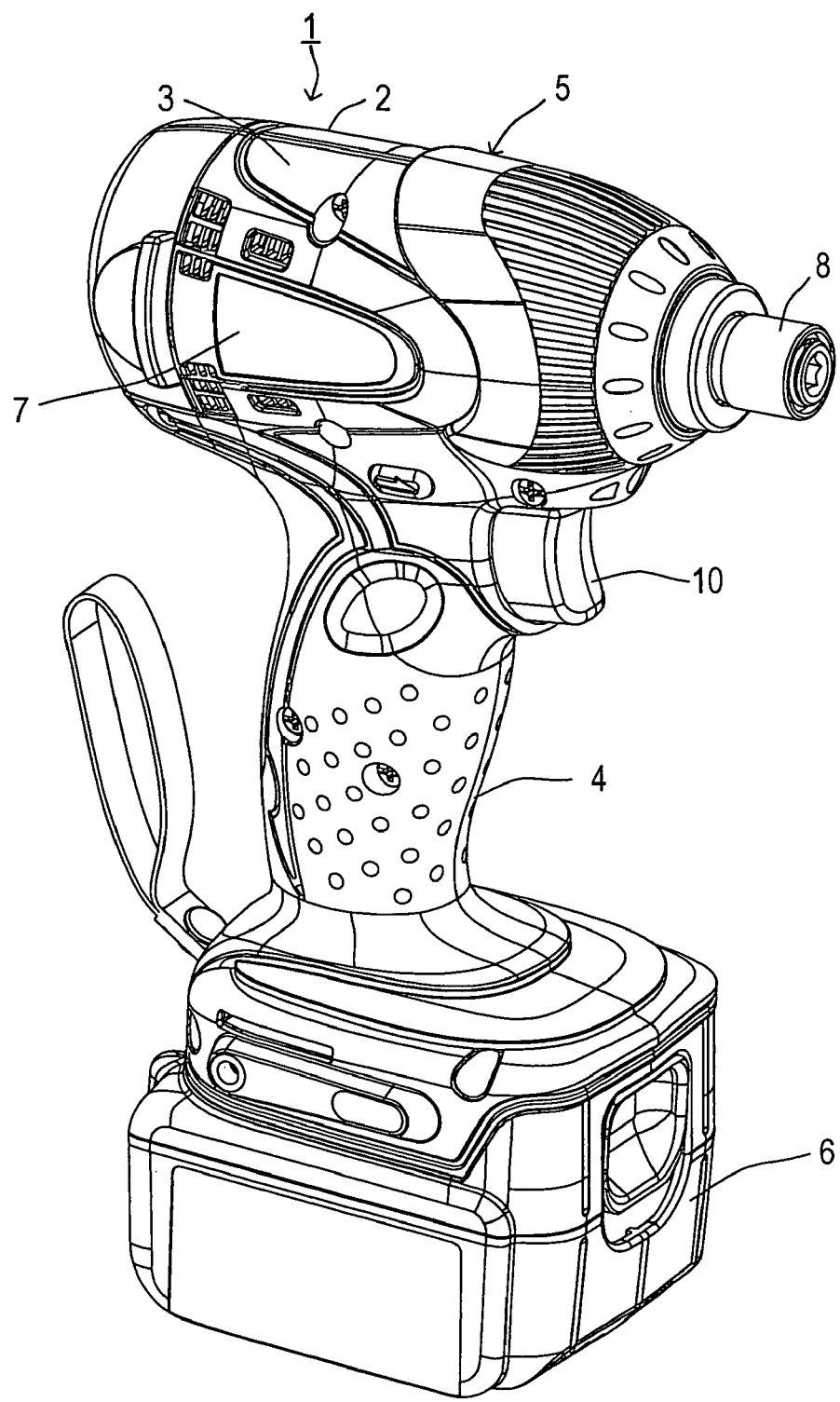
FIG. 1 is a perspective view showing an appearance of a rechargeable impact driver in the embodiment.

As shown in FIG. 1, a rechargeable impact driver 1 in the embodiment of the present invention is formed by assembling right and left half housings 2, 3, and includes a body housing 5 with a handle portion 4 provided in an extending manner in a lower part thereof and a battery pack 6 to be attachably/detachably mounted in a lower end of the handle portion 4 of the body housing 5.

A motor housing portion 7 for housing a direct current (DC) motor 20 (see FIG. 2) as a power source of the rechargeable impact driver 1 is provided at a rear (on a left side in FIG. 1) of the body housing 5. A decelerating mechanism and a percussion mechanism are housed ahead of the motor housing portion 7. A chuck sleeve 8 for attaching a tool bit (not shown) to a top end of the percussion mechanism is extendingly provided to a front of the body housing 5.

The percussion mechanism including, for example, a spindle rotated through the deceleration mechanism, a hammer rotated with the spindle and movable in an axial direction and an anvil provided at a front of the hammer to facilitate attachment of the tool bit thereto.

The percussion mechanism operates as follows:

Specifically, in the percussion mechanism, when the spindle is rotated following a rotation of the DC motor 20, the anvil is rotated through the hammer, causing the tool bit to be rotated. Subsequently, when screw tightening by the tool bit proceeds and a load on the anvil is increased, the hammer retreats against a biasing force of a coil spring to depart from the anvil and then rotates with the spindle, and to advance by a biasing force of a coil spring to again engage with the anvil to provide an intermittent percussion, thereby performing additional tightening. Since such a percussion mechanism is well-known (see, for example, Japanese Unexamined Patent Publication No. 2006-218605), a detailed explanation thereof is omitted here.

The handle portion 4 of the body housing 5 includes a trigger switch 10 operable by a user while gripping the handle portion 4. The handle portion 4 houses a drive unit that operates by receiving power supply from the battery pack 6 and rotates the DC motor 20 while the trigger switch 10 is being operated.

Figure 2:
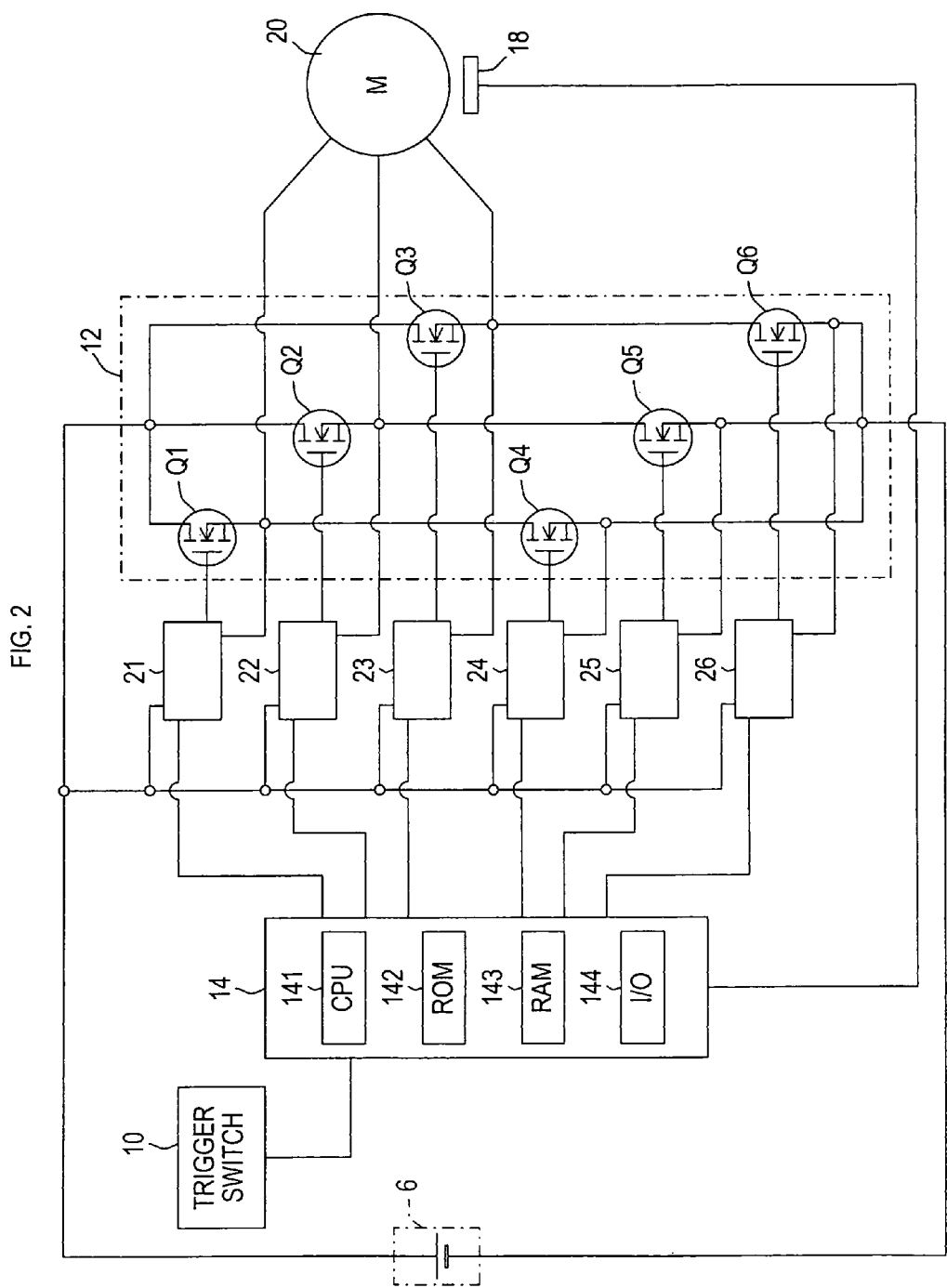
FIG. 2 is an electrical circuit diagram showing a configuration of a drive unit of a direct current motor in the embodiment.

As shown in FIG. 2, the DC motor 20 in the embodiment is constituted as a three-phase brushless motor, in which terminals for respective phases of the DC motor 20 are connected to the battery pack 6 as a DC power source through a bridge circuit 12.

The bridge circuit 12 includes three switching devices Q1-Q3 as so-called high-side switches and three switching devices Q4-Q6 as so-called low-side switches. The switching devices Q1-Q3 connect respective terminals for respective phases of the DC motor 20 to a positive side of the battery pack 6, while the switching devices Q4-Q6 connect respective terminals of the DC motor 20 to a negative side of the battery pack 6.

The switching devices Q1-Q6 constituting the bridge circuit 12 include n-channel FETs, and gate circuits 21-26, which turn on the switching devices Q1-Q6 by applying drive voltages equal to or exceeding threshold values between gates and sources of the switching devices Q1-Q6, are connected to the respective switching devices Q1-Q6. The gate circuits 21-26 are adapted for individually turning on/off the switching devices Q1-Q6 in the bridge circuit 12. The gate circuits 21-26 are controlled by a control circuit 14.

Specifically, when the trigger switch 10 is operated, the control circuit 14 turns on/off the switching devices Q1-Q6 in the bridge circuit 12 through the respective gate circuits 21-26 based on a detection signal from a rotation position sensor 18 provided to the DC motor 20 to thereby control current flow to respective phase windings of the DC motor 20 and rotate the DC motor 20. Control signals to drive the respective switching devices Q1-Q6 are inputted from the control circuit 14 to the respective gate circuits 21-26.

The trigger switch 10 is configured to generate a signal corresponding to an operation amount (a drawing amount) when the trigger switch 10 is operated by the user. The control circuit 14 loads the signal as a command value, and sets a driving duty ratio of the bridge circuit 12 such that a current flow amount to the DC motor 20 is increased as the drawing amount of the trigger switch 10 is increased.

That is, the control circuit 14 sets the driving duty ratio to PWM control the DC motor 20 in accordance with the command value from the trigger switch 10, and duty drives the switching devices in the bridge circuit 12 in accordance with the driving duty ratio, thereby controlling currents flowing in the respective phases of the DC motor 20 to rotate the DC motor 20 at a speed corresponding to the operation amount of the trigger switch 10.

The control circuit 14 in the embodiment is a microcomputer which includes at least a CPU 141, a ROM 142, a RAM 143 and an input/output (I/O) port 144. In the control circuit 14, the CPU 141 performs various processings according to a program stored in the ROM 142.

A control process performed by the control circuit 14 will be described hereinafter with reference to the flowchart in FIG. 3.

Figure 3:
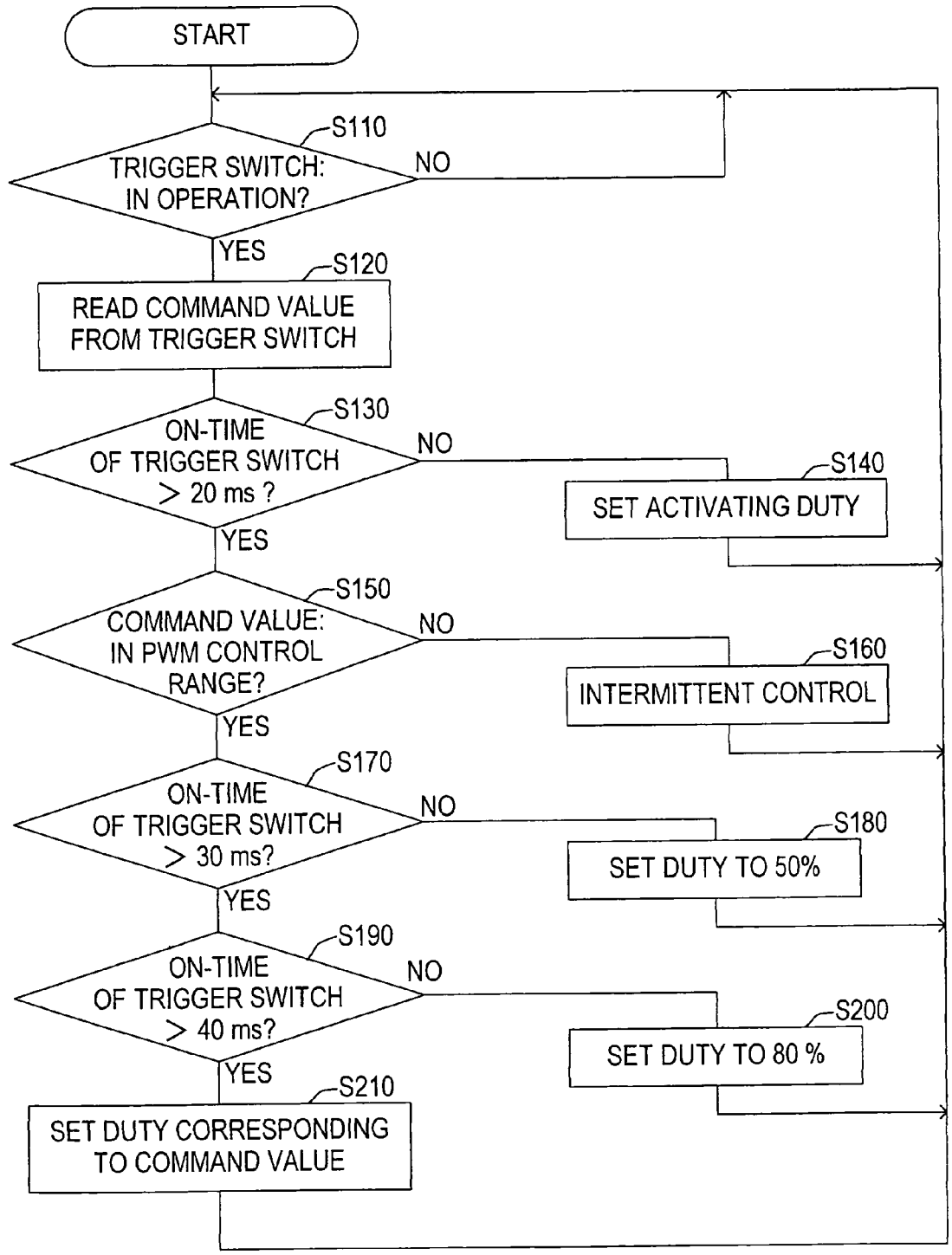
FIG. 3 is a flowchart showing a control process performed by a control circuit in order to drive the direct current motor.

As shown in FIG. 3, the control circuit 14 determines in S110 ("S" indicates "Step") whether or not the trigger switch 10 is in an ON state by a user's operation. When it is determined in S110 that the trigger switch 10 is in the ON state since the trigger switch 10 is operated or being operated, the present process proceeds to S120.

In S120, the command value indicating the operation amount (i.e. the drawing amount) of the trigger switch 10 is read from the trigger switch 10.

Subsequently, in S130, it is determined whether or not an elapsed time (i.e., an ON-time of the trigger switch 10) since the trigger switch 10 is operated exceeds an activating time (for example, 20 ms) required to transfer the DC motor 20 from a stopped state to a rotating state. When it is determined that the ON-time of the trigger switch 10 does not exceed the activating time (for example, 20 ms), the present process proceeds to S140.

In S140, a driving duty ratio for activating (ACTIVATING DUTY in FIG. 3), required to generate a activating torque which may exceed a holding torque when rotation of the DC motor 20 is stopped, is set as a driving duty ratio of the DC motor 20, and control signals are outputted to the gate circuits 21-26. Then, the present process proceeds to S110 again.

When it is determined in S130 that the ON-time of the trigger switch 10 exceeds the activating time (for example, 20 ms), the present process proceeds to S150.

In S150, it is determined whether or not the command value (i.e. the drawing amount of the trigger switch 10) is in a PWM control range by determining whether or not the command value (i.e. the drawing amount) read from the trigger switch 10 is equal to or more than a lower limit value (i.e. a lower limit operation amount) corresponding to the activating DUTY.

When the command value (i.e. the drawing amount) is smaller than the lower limit value (i.e. the lower limit operation amount) and is not in the PWM control range, an intermittent control is performed in order to rotate at a speed lower than the rotation speed controlled by the activating DUTY. Specifically, flow and stop of current to the DC motor 20 is switched in a proportion corresponding to the command value (i.e. the drawing amount). Then, the present process proceeds to S110 again. The driving duty ratio used for flow of current to the DC motor 20 in the intermittent control may be, for example, the activating DUTY.

When it is determined in S150 that the command value (i.e. the drawing amount) is equal to or more than the lower limit value (i.e. the lower limit operation amount) and is in the PWM control range, the present process proceeds to S170.

In S170, it is determined whether or not the ON-time of the trigger switch 10 exceeds a predetermined set time (for example, 30 ms). The set time is longer than the activating time (for example, 20 ms) and is shorter than an after-mentioned start-up time (for example, 40 ms). When it is determined that the ON-time of the trigger switch 10 does not exceed the set time (for example, 30 ms), the present process proceeds to S180. In S180, a predetermined first driving duty ratio (for example, 50%) is set as the driving duty ratio (DUTY) of the DC motor 20, and control signals are outputted to the gate circuits 21-26. Then, the present process proceeds to S110 again. Specifically, the first driving duty ratio is set to be larger than the activating DUTY and smaller than a driving duty ratio (a voltage reduction duty ratio) which reduces a power source voltage in the battery pack 6 below a predetermined lower limit voltage.

When it is determined in S170 that the ON-time of the trigger switch 10 exceeds the set time (for example, 30 ms), the present process proceeds to S190. In S190, it is determined whether or not the ON-time of the trigger switch 10 exceeds a predetermined start-up time (for example, 40 ms).

When it is determined that the ON-time of the trigger switch 10 does not exceed the start-up time (for example, 40 ms), the present process proceeds to S200. In S200, a predetermined second driving duty ratio (for example, 80%) is set as the driving duty ratio (DUTY) of the DC motor 20, control signals are outputted to the gate circuits 21-26. Then, the present process proceeds to S110 again. More specifically, the second driving duty ratio is set to be larger than the first driving duty ratio and smaller than the voltage reduction duty ratio.

When it is determined in S190 that the ON-time of the trigger switch 10 exceeds the start-up time (for example, 40 ms), the present process proceeds to S210. In S210, a driving duty ratio (DUTY) corresponding to the command value from the trigger switch 10 is set, and control signals are outputted to the gate circuits 21-26. Then, the present process proceeds to S110 again.

As described above, in the rechargeable impact driver 1 in the present embodiment, the driving duty ratio is set to be smaller than the voltage reduction duty ratio during the period from when the trigger switch 10 is turned on until when the start-up time (for example, 40 ms) has elapsed.

Figure 4:
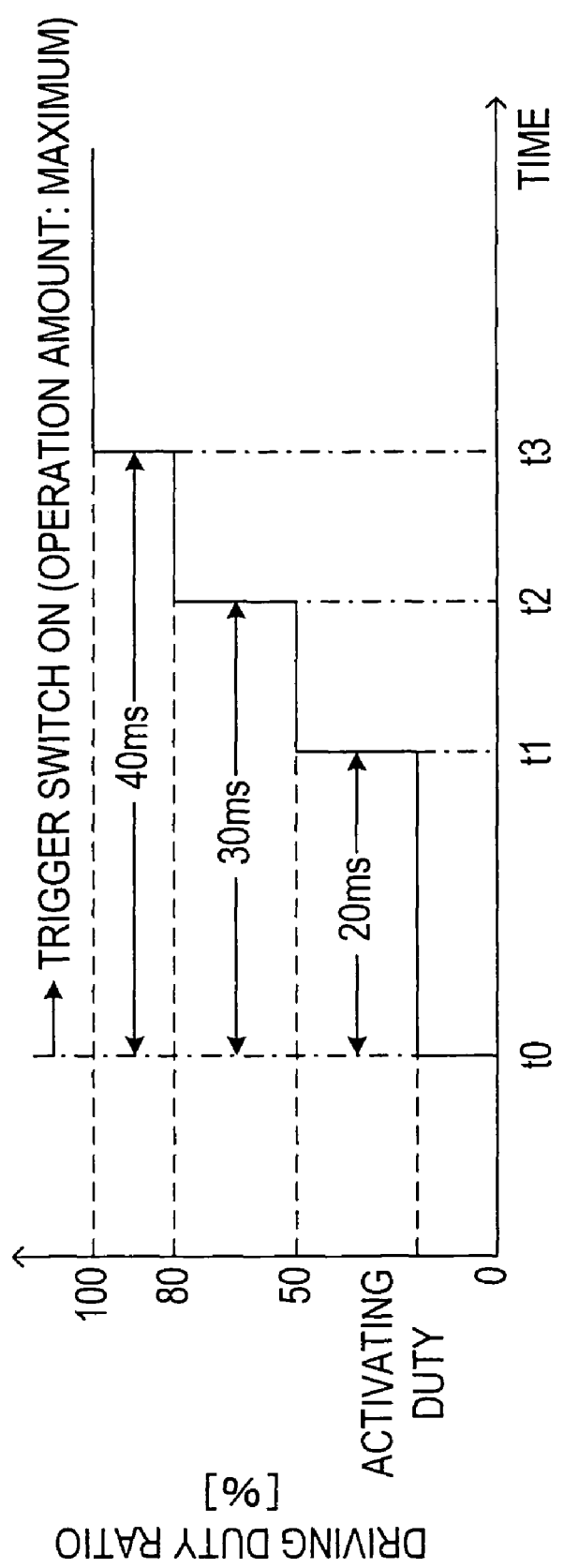
FIG. 4 is an explanatory view illustrating a setting procedure of a driving duty ratio by the control process shown in FIG. 3.

More specifically, as shown in FIG. 4, when a user operates the trigger switch 10 (at a time t0), the DC motor 20 is PWM controlled by the predetermined activating DUTY to generate a torque on the DC motor 20 required for transfer from the stopped state to the rotating state and thereby activate the DC motor 20 until the activating time (for example, 20 ms) has elapsed.

Subsequently, when the ON-time of the trigger switch 10 has reached the activating time (for example, 20 ms) (at a time t1), the DC motor 20 is PWM controlled by the first driving duty ratio (for example, 50%), which is smaller than the voltage reduction duty ratio, until the ON-time of the trigger switch 10 has reached the set time (for example, 30 ms) (at a time t2).

When the ON-time of the trigger switch 10 has reached the set time (for example, 30 ms), the DC motor 20 is PWM controlled by the second driving duty ratio (for example, 80%), which is larger than the first driving duty ratio and smaller than the voltage reduction duty ratio, until the ON-time of the trigger switch 10 has reached the start-up time (for example, 40 ms) (at a time t3).

As a result, the DC motor 20 is accelerated in a stepwise manner during a period from when the trigger switch 10 is operated until when the start-up time (for example, 40 ms) has elapsed. Accordingly, in the rechargeable impact driver 1 in the present embodiment, even when a user operates the trigger switch 10 with the maximum operation amount, a maximum value (for example, 100%) of the driving duty ratio of the DC motor 20 will not be set immediately after the user's operation.

According to the rechargeable impact driver 1 in the present embodiment, therefore, the activating current which flows immediately after driving of the DC motor 20 is started can be suppressed as compared with conventional equivalents. Also, voltage reduction of the battery pack 6 caused by increase in the activating current can be suppressed since the starting current can be suppressed as described above.

Thus, the rechargeable impact driver 1 in the present embodiment, in which the control circuit 14 is configured to perform lock determination according to the procedure of monitoring the power source voltage immediately after driving of the DC motor 20 is started, and determining that the DC motor 20 is mechanically locked when the power source voltage is lowered than a predetermined lower limit voltage and stopping the driving of the DC motor 20, may suppress flow of an excess motor current through the DC motor 20 and the bridge circuit 12 and the resulting deterioration of these components when the DC motor 20 is locked.

Furthermore, in the rechargeable impact driver 1 in the present embodiment, when the ON-time of the trigger switch 10 exceeds a predetermined start-up time (for example, 40 ms), a driving duty ratio corresponding to the command value from the trigger switch 10 as the driving duty ratio (DUTY) of the DC motor 20. Accordingly, after the start-up time has elapsed the DC motor 20 is PWM controlled by the driving duty ratio (DUTY) corresponding to the command value from the trigger switch 10, and the rechargeable impact driver 1 is appropriately operated in accordance with the user's command.

Moreover, in the rechargeable impact driver 1 in the present embodiment, when the ON-time of the trigger switch 10 has reached the activating time (for example, 20 ms), it is determined whether or not the command value from the trigger switch 10 is in the PWM control range, and intermittent control to allow intermittent current flow to the DC motor 20 is performed when the command value is not in the PWM control range.

According to the rechargeable impact driver 1 in the present embodiment, therefore, when the operation amount of the trigger switch 10 is small and it is required to drive the DC motor 20 at a speed lower than the rotation speed corresponding to the activating DUTY, it is possible to control the DC motor 20 to be at a speed corresponding to the operation amount of the trigger switch 10 by intermittent control of the DC motor 20, thereby expanding a controllable rotation speed range.

Although one embodiment of the present invention has been described above, it is to be understood that the present invention should not be limited to the above embodiment, but may be embodied in various forms within the scope of matters described in the claims.

For example, in the above embodiment, the driving duty ratio (DUTY) is increased in a stepwise manner from "activating DUTY" to "50%" and further to "80%" as shown in FIG. 4 during the period from when the trigger switch 10 is operated until when the predetermined start-up time (for example, 40 ms) has elapsed, while the driving duty ratio is set in accordance with the command value from the trigger switch 10 once the start-up time has elapsed. In this case, however, the rotation speed of the DC motor 20 may become higher than the rotation speed required by the user during the period from when the operation of the trigger switch 10 is started until when the start-up time has elapsed depending on the command value (i.e. the drawing amount) from the trigger switch 10, causing the user to feel uncomfortable.

Figure 5:
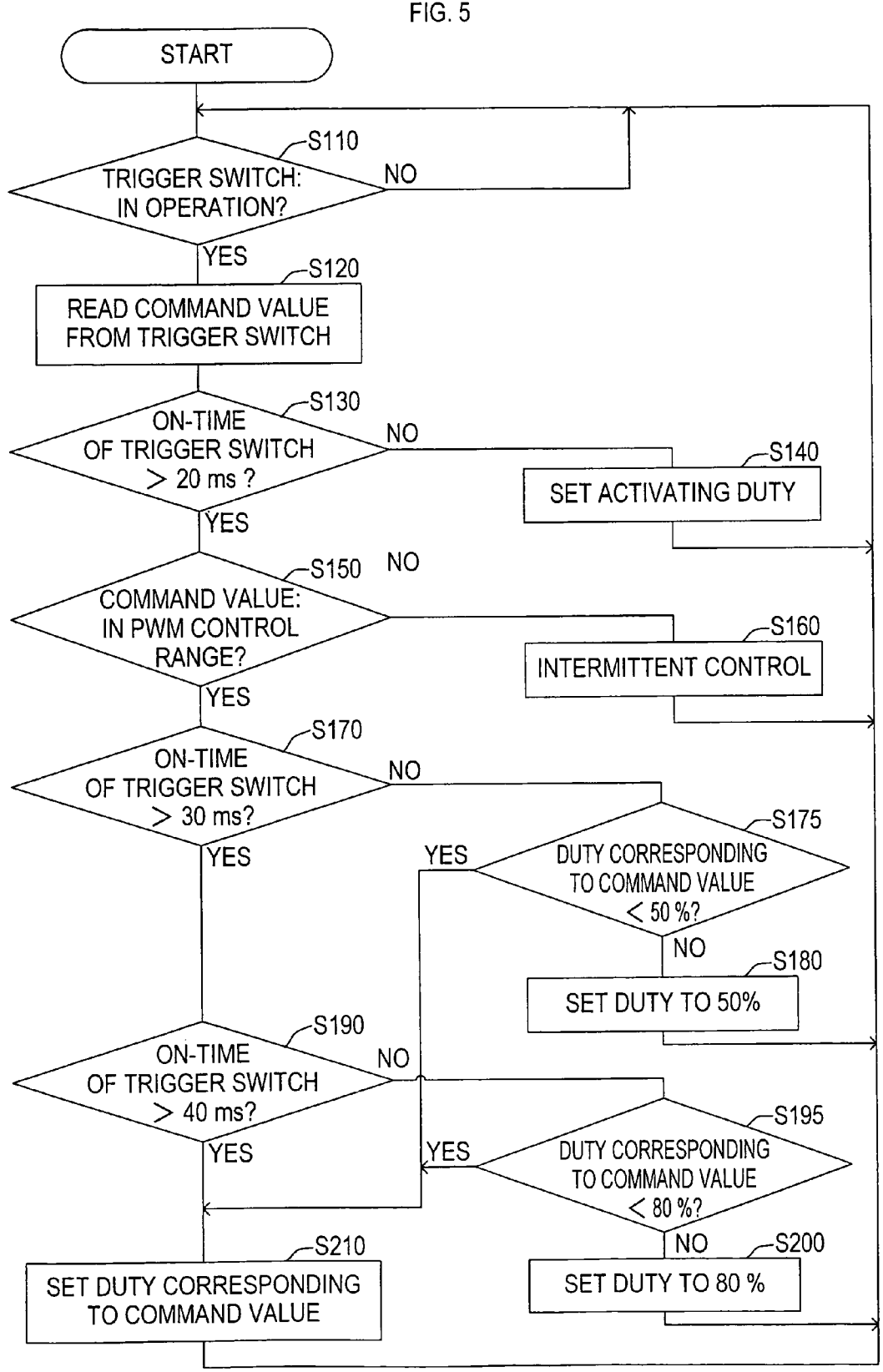
FIG. 5 is a flowchart showing a modified example of the control process shown in FIG. 3.

In view of the above, the control process performed to set the driving duty ratio by the control circuit 14 may be performed according to the proceedings shown in FIG. 5. The flowchart shown in FIG. 5 is basically the same as the control process in FIG. 3 and differences lie in addition of determination processes in S175 and S195.

The following description is provided regarding to the difference. In the control process shown in FIG. 5, when the ON-time of the trigger switch 10 is longer than the activating time (for example, 20 ms) and is equal to or shorter than the set time (for example, 30 ms) (S170: YES), the driving duty ratio (the first driving duty ratio: DUTY 50%) set corresponding to the ON-time of the trigger switch 10 and the driving duty ratio (the second driving duty ratio) set in accordance with the command value from the trigger switch 10 are compared in S175.

When the first driving duty ratio (DUTY 50%) is larger than the second driving duty ratio, the process proceeds to S210, in which the second driving duty ratio is set as the driving duty ratio to be used for control. When the first driving duty ratio (DUTY 50%) is equal to or smaller than the second driving duty ratio, the process proceeds to S180, in which the first driving duty ratio (DUTY 50%) is set as the driving duty ratio to be used for control.

When the ON-time of the trigger switch 10 is longer than the set time (for example, 30 ms) and is equal to or shorter than the start-up time (for example, 40 ms) (S190: YES), the process proceeds to S195. In S195, the driving duty ratio (the first driving duty ratio: DUTY 80%) set corresponding to the ON-time of the trigger switch 10 and the driving duty ratio (the second driving duty ratio) set in accordance with the command value from the trigger switch 10 are compared.

When the first driving duty ratio (DUTY 80%) is larger than the second driving duty ratio, the process proceeds to S210, in which the second driving duty ratio is set as the driving duty ratio to be used for control. When the first driving duty ratio (DUTY 80%) is equal to or smaller than the second driving duty ratio, the process proceeds to S200, in which the first driving duty ratio (DUTY 80%) is set as the driving duty ratio to be used for control.

In the control process shown in FIG. 5 as described above, the first driving duty ratio set corresponding to the ON-time of the trigger switch 10 is set as the driving duty ratio for control only when the first driving duty ratio is equal to or smaller than the second driving duty ratio set in accordance with the command value (the drawing value) from the trigger switch 10. Accordingly, the driving duty ratio to be used for control will not exceed the second driving duty ratio. It is, therefore, possible to suppress the rotation speed of the DC motor 20 from becoming higher than the rotation speed required by the user during the period from when the operation of the trigger switch 10 is started until when the start-up time has elapsed.

In the above described embodiment, when the start-up time (for example, 40 ms) has elapsed since the driving of the DC motor 20 is started, the driving duty ratio is set in accordance with the command value (the drawing value) from the trigger switch 10. It may be possible, however, to set the driving duty ratio by merely using the command value (the drawing value) from the trigger switch 10. It may also be possible to calculate a target rotation speed of the DC motor 20 based on the command value (the drawing value) from the trigger switch 10 and set the driving duty ratio so as to make a deviation between the target rotation speed and an actual rotation speed zero.

Also, while the present invention is applied to a rechargeable impact driver in the above described embodiment, the present invention may be applied to any electric power tool provided with a DC motor as a power source in a same manner as in the above described embodiment to achieve the same effects.

Further, while the switching devices in the bridge circuit 12 are all constituted by n-channel FETs, a p-channel FET, for example, may be used as a high side switch. Alternatively, bipolar transistors may be used as the respective switching devices.

The control circuit 14, which is constituted by a microcomputer in the above embodiment, may be constituted by an ASIC (Application Specific Integrated Circuits) or a programmable logic device, such as FPGA (Field Programmable Gate Array).

While the present invention is applied to a drive unit configured to drive a three-phase brushless DC motor by turning on/off six switching devices, the present invention may be applied to a drive unit configured to drive a brushed DC motor by turning on/off one switching device. The present invention also may be applied to a drive unit configured to drive a brushed DC motor by turning on/off four switching devices which form a so-called H-bridge circuit (full-bridge circuit). The present invention further may be applied to a drive unit configured to drive a brushed DC motor by turning on/off two switching devices which form a so-called push-pull circuit (half-bridge circuit).

While the ROM 142 in the control circuit 14 is used as the recording medium for the program of the control process in the above embodiment, the RAM 143 may be used instead of the ROM 142.

Also, the program of the control process may be recorded in computer-readable recording media other than a ROM and a RAM. Such recording media include, for example, a flexible disk (FD), an optical disk (MO), a DVD, a CD-ROM, a Blu-Ray disk, a HD-DVD, a hard disk, and a portable semiconductor memory (e.g., a USB memory, a memory card, etc.).

Further, the program of the control process may be provided to the control circuit 14 through a network.

While the driving duty ratio is increased in a stepwise manner within a range smaller than the voltage reduction duty ratio during the period from when the trigger switch 10 is turned on until when the predetermined start-up time (for example, 40 ms) has elapsed, the driving duty ratio may be constant within a range smaller than the voltage reduction duty ratio.

What is claimed is:

1. An electric power tool, comprising:
   a direct current motor that is rotated by electric power supplied from a direct current power source and drives a tool bit;
   at least one switching device that is provided on a current path from the direct current power source to the direct current motor;
   a trigger switch operated by a user;
   a control unit that sets a driving duty ratio for PWM controlling the direct current motor so as to increase the driving duty ratio in a stepwise manner in accordance with an operation continuation time of the trigger switch during a period from when an operation of the trigger switch is started until when a predetermined start-up time has elapsed; and
   a drive unit that turns on/off the at least one switching device in accordance with the driving duty ratio set by the control unit to thereby rotate the direct current motor.

2. The electric power tool according to claim 1, wherein the control unit sets the driving duty ratio in accordance with an operation amount of the trigger switch when the start-up time has elapsed since the operation of the trigger switch is started.

3. The electric power tool according to claim 1, wherein the control unit sets a driving duty ratio for activating which is required to transfer the direct current motor from a stopped state to a rotating state during a period from when the operation of the trigger switch is started until when an activating time shorter than the start-up time has elapsed.

4. The electric power tool according to claim 3, wherein the control unit determines whether or not the operation amount of the trigger switch is equal to or more than a lower limit operation amount predetermined in accordance with the driving duty ratio for activating when the activating time has elapsed since the operation of the trigger switch is started, and performs an intermittent control to intermittently supply current to the direct current motor through the drive unit when the operation amount of the trigger switch is smaller than the lower limit operation amount.

5. The electric power tool according to claim 1, wherein the control unit determines whether or not a first driving duty ratio set in accordance with an operation continuation time of the trigger switch is larger than a second driving duty ratio set in accordance with an operation amount of the trigger switch during a period from when the operation of the trigger switch is started until when the start-up time has elapsed, and outputs the second driving duty ratio when the first driving duty ratio is larger than the second driving duty ratio.

6. The electric power tool according to claim 1, wherein the control unit determines whether or not a power source voltage of the direct current power source is lower than a predetermined lower limit voltage when the trigger switch is being operated, and detects an abnormality of the direct current motor when the power source voltage is lower than the lower limit voltage.

7. The electric power tool according to claim 1,
   wherein the at least one switching device is a plurality of switching devices, the plurality of switching devices forming a bridge circuit on the current path, and
   wherein the drive unit turns on/off the plurality of switching devices.

8. The electric power tool according to claim 1,
   wherein the control unit sets the driving duty ratio so as to increase the driving duty ratio, within a range smaller than a driving duty ratio which reduces a voltage of the direct current power source below a predetermined lower limit voltage, in the stepwise manner in accordance with the operation continuation time of the trigger switch during the period from when the operation of the trigger switch is started until when the predetermined start-up time has elapsed.

9. The electric power tool according to claim 1,
   wherein the trigger switch is operated to set the driving duty ratio corresponding to an operation amount of the trigger switch.

10. A control unit comprising:
    an operation detecting section that detects an operation of a trigger switch operated by a user; and
    a duty ratio setting section that sets a driving duty ratio for PWM controlling a direct current motor so as to increase the driving duty ratio in a stepwise manner in accordance with an operation continuation time of the trigger switch during a period from when the operation detecting section detects the operation of the trigger switch until when a predetermined start-up time has elapsed.

11. A recording medium readable by a computer, the recording medium recording a program for causing the computer to execute:
    an operation detection step of detecting an operation of a trigger switch operated by a user; and
    a driving duty ratio setting step of setting a driving duty ratio for PWM controlling a direct current motor so as to increase the driving duty ratio in a stepwise manner in accordance with an operation continuation time of the trigger switch during a period from when the operation of the trigger switch is detected in the operation detection step until when a predetermined start-up time has elapsed.

* * * * *